(12) United States Patent
Hodinot et al.

(10) Patent No.: US 9,091,217 B2
(45) Date of Patent: Jul. 28, 2015

(54) METHOD AND DEVICE FOR FEEDING A TURBOMACHINE COMBUSTION CHAMBER WITH A REGULATED FLOW OF FUEL

(75) Inventors: Laurent Gilbert Yves Hodinot, Cesson (FR); Celine Marie Anne Issert, Corbeil Essonnes (FR); Pascal Laurent Marly, Melun (FR)

(73) Assignee: SNECMA, Paris (FR)

( * ) Notice: Subject to any disclaimer, the term of this patent is extended or adjusted under 35 U.S.C. 154(b) by 933 days.

(21) Appl. No.: 13/318,036

(22) PCT Filed: Apr. 15, 2010

(86) PCT No.: PCT/FR2010/050722
§ 371 (c)(1),
(2), (4) Date: Oct. 28, 2011

(87) PCT Pub. No.: WO2010/125273
PCT Pub. Date: Nov. 4, 2010

(65) Prior Publication Data
US 2012/0042657 A1    Feb. 23, 2012

(30) Foreign Application Priority Data
Apr. 29, 2009  (FR) ..................................... 09 52828

(51) Int. Cl.
*F02C 7/20* (2006.01)
*F02C 6/00* (2006.01)
*F02C 9/38* (2006.01)
(Continued)

(52) U.S. Cl.
CPC . *F02C 9/38* (2013.01); *F02C 7/232* (2013.01); *F02C 9/263* (2013.01); *Y02T 50/671* (2013.01)

(58) Field of Classification Search
CPC ............ F23R 3/28; F02C 7/232; F02C 7/236; F02C 9/26; F02C 9/263; F02C 9/32; F02C 9/38
USPC ........... 60/39.281, 776, 790, 39.81, 240, 243, 60/764
See application file for complete search history.

(56) References Cited

U.S. PATENT DOCUMENTS 2,809,492 A * 10/1957 Arkawy ..................... 60/39.281
4,508,127 A *  4/1985 Thurston .......................... 137/8
4,922,710 A     5/1990 Rowen et al.
(Continued)

FOREIGN PATENT DOCUMENTS

EP    1 416 136    5/2004
EP    1 510 795    3/2005
(Continued)

*Primary Examiner* — Gerald L Sung
(74) *Attorney, Agent, or Firm* — Oblon, McClelland, Maier & Neustadt, L.L.P.

(57) ABSTRACT

High-pressure fuel is supplied at a controlled rate to a combustion chamber via a position-controlled valve and a variable-restriction stop-and-pressurizing cut-off valve. A value representative of the real mass flow rate of fuel as delivered is calculated by a calculation unit on the basis of information representative of the pressure difference between the inlet and the outlet of the cut-off valve and of the flow section through the cut-off valve, e.g. as represented by the position X of the slide of the cut-off valve. The position-controlled valve has a variable position that is controlled by the calculation unit as a function of the difference between the calculated value representative of the real mass flow rate and a value representative of a desired mass flow rate.

20 Claims, 5 Drawing Sheets

(51) Int. Cl.
  *F02C 7/232* (2006.01)
  *F02C 9/26* (2006.01)

(56) References Cited

U.S. PATENT DOCUMENTS

| | | | | |
|---|---|---|---|---|
| 5,259,186 | A | * | 11/1993 | Snow .......................... 60/39.281 |
| 5,772,182 | A | * | 6/1998 | Stambaugh et al. ........... 251/325 |
| 6,182,438 | B1 | * | 2/2001 | Weber ............................ 60/778 |
| 6,321,527 | B1 | | 11/2001 | Dyer et al. |
| 7,784,487 | B2 | * | 8/2010 | Arnett ........................... 137/468 |
| 2003/0046937 | A1 | | 3/2003 | Mahoney et al. |
| 2003/0192300 | A1 | | 10/2003 | Mahoney et al. |
| 2004/0083711 | A1 | | 5/2004 | Hodinot et al. |
| 2005/0043905 | A1 | | 2/2005 | Vary |
| 2008/0163931 | A1 | | 7/2008 | Brocard et al. |
| 2008/0229726 | A1 | * | 9/2008 | Clements ................... 60/39.281 |

FOREIGN PATENT DOCUMENTS

| | | |
|---|---|---|
| FR | 2 882 098 | 8/2006 |
| WO | 99 35385 | 7/1999 |
| WO | 03 023208 | 3/2003 |

* cited by examiner

METHOD AND DEVICE FOR FEEDING A TURBOMACHINE COMBUSTION CHAMBER WITH A REGULATED FLOW OF FUEL

BACKGROUND OF THE INVENTION

The invention relates to regulating the flow of fuel delivered to a turbomachine combustion chamber. The invention is applicable to all types of turbomachine, and in particular to aviation turbines and to industrial stationary turbines.

FIG. 1 shows, in highly diagrammatic manner, a well-known conventional flow rate regulator device for use, for example, in an airplane turbomachine.

A low-pressure fuel circuit 1 supplies a high-pressure pump 2 with fuel taken from a tank by means of a low-pressure pump. The outlet from the high-pressure pump 2 is connected to a metering unit 3 having a slide of position that is controlled by an electrohydraulic servo-valve 3a in order to adjust the flow section through the metering unit. A bypass valve 4, e.g. rated by a spring, has ports connected respectively to the inlet and to the outlet of the metering unit 3 in order to maintain a constant pressure difference dP between said inlet and outlet so that the flow rate through the metering unit is a function of its flow section. The bypass valve 4 is mounted in a return loop 5 for returning to the low-pressure fuel circuit 1 the fuel that is delivered in excess by the high-pressure pump, since its speed is associated with the speed of the turbomachine.

An electronic control unit 6, generally incorporated in the electronic regulator unit of the turbomachine, controls the servo-valve 3a to servo-control the position of the slide of the metering unit to occupy a setpoint position that is determined as a function of the desired flow rate, with the actual position of the slide being detected by a sensor 3b. The high-pressure fuel delivered by the pump is also used as a servo-control hydraulic fluid for various pieces of equipment of the turbomachine, and in particular the servo-valve 3a that has a high-pressure port receiving the high-pressure fuel via a heater 7 and a low-pressure port connected to the low-pressure fuel circuit 1. The heater 7 is typically a fuel/oil heat exchanger. It serves to eliminate any icing that might be present in the fuel used for servo-control purposes and to cool the lubricating oil that is used in the turbomachine.

The outlet from the metering unit 3 is connected to the combustion chamber 8 that is fitted with injectors via a cut-off valve 9, e.g. controlled by a solenoid valve 9a. The cut-off valve 9 is a stopping and pressurizing cut-off valve that may possibly also be used for protecting the turbomachine against overspeeds. The solenoid valve 9a is controlled by the control unit 6 to close the cut-off valve 9 when required. A proximity sensor 9b provides the control unit 6 with information representative of the closed or open state of the cut-off valve. In a variant, a second bypass valve could be inserted between the metering unit and the stop cut-off valve, being controlled by an overspeed servo-valve or solenoid valve in order to divert the injected flow rate in the event of overspeed being detected.

Document WO 03/023208 describes a device for regulating the flow rate of fuel delivered to a gas turbine engine having a metering unit, a bypass valve maintaining a constant pressure difference between an inlet and an outlet of the metering unit, and a cut-off and pressurizing valve downstream from the metering unit.

Controlling the flow section of the metering unit that is subjected to a constant pressure difference enables the volume flow rate to be regulated.

In order to improve the accuracy of regulation while delivering a controlled mass flow rate, it is desirable to take account of the variation in the density of the fuel as a function of temperature. To this end, it is known to fit the slide of the metering unit with a rod made of a material that is selected to have a coefficient of thermal expansion that is suitable for compensating variation in the density of the fuel, with a small variation in the flow section thus being obtained as a function of temperature for a given detected position of the slide. It is also known from document WO 99/35385 to take account of variation in the density of the fuel as a function of temperature by using bimetallic disks having bearing thereagainst the rating spring of the bypass valve that is associated with the metering unit.

Furthermore, document US 2008/0163931 describes measuring the mass flow rate of fuel by means of a device that enables a measurement to be made of the flow section for fuel through the device as a function of a pressure drop through the device and from the density of the fuel. The measurement device is mounted at the outlet from a pump unit and the mass flow rate is regulated by controlling a variable-restriction valve by means of a servo-control loop that receives information representative of the desired mass flow rate and of the measured mass flow rate. A stop cut-off valve is also provided.

OBJECT AND SUMMARY OF THE INVENTION

An object of the invention is to further improve the accuracy with which the fuel flow rate is regulated while enabling the architecture of the regulation and cut-off assembly to be simplified.

In a first aspect of the invention, this object is achieved by a method comprising:
  supplying high-pressure fuel by means of a high-pressure pump receiving the fuel from a low-pressure fuel circuit;
  using a flow rate regulation unit connected to the outlet from the high-pressure pump to supply high-pressure fuel at a controlled rate via a position-controlled valve and a variable-restriction stop-and-pressurizing cut-off valve;
in which method:
  a value representative of the real mass flow rate of the fuel supplied to the combustion chamber is calculated by a calculation unit on the basis of information representative of the pressure difference between the inlet and the outlet of the cut-off valve and of the flow section therethrough; and
  the position of the position-controlled valve is controlled by the calculation unit as a function of the difference between the calculated value representative of the real mass flow rate and a value that is representative of a desired mass flow rate.

Increased regulation accuracy is provided by measuring the real mass flow rate of the fuel, thereby enabling said flow rate to be servo-controlled to a desired value.

In addition, in order to measure the real mass flow rate, the stop-and-pressurizing cut-off valve is used. Thus, the functions of regulating the fuel flow rate and of stop and pressurization cut off are provided by a variable-position valve associated with a variable-restriction cut-off valve, and thus with architecture that is simplified compared with that of the prior art device such as that shown in FIG. 1, since there is no conventional metering unit. The same cut-off valve can also be used to perform an overspeed protection function by being controlled to close in the event of turbomachine overspeed being detected.

According to a feature of the method, the value representative of the real mass flow rate $W_f$ is calculated in application of the formula:

$$W_f = K\sqrt{\rho \cdot \Delta P}$$

where K is a coefficient of value that is a function in particular of the flow section through the cut-off valve, $\rho$ is the density of the fuel passing through said valve, and $\Delta P$ is the pressure difference between the inlet and the outlet thereof.

The information representative of the flow section through the cut-off valve may be provided by detecting the position X of a slide of the cut-off valve.

In an implementation of the method, information representative of the temperature T of the fuel passing through the cut-off valve is supplied to the calculation unit, and the value of K is determined as a function of the position X and of the temperature T.

A density meter may be used to supply the calculation unit with information representative of the density $\rho$ of the fuel passing through the cut-off valve, the density meter also preferably providing information representative of the temperature T of the fuel passing therethrough.

It should be observed that in order to be able to calculate the real mass flow rate accurately, the information representative of temperature T and/or the information representative of the density $\rho$ of the fuel passing through the cut-off valve should be taken from the proximity of the cut-off valve, preferably as close as possible thereto, either upstream or downstream in the fuel flow direction.

In another embodiment, the position X of the slide of the cut-off valve is provided by a position sensor associated with a rod secured to the slide, and the rod is made of a material that is selected to have a coefficient of thermal expansion such that the influence of temperature on the density of the fuel passing through said valve is substantially compensated by the influence of temperature on the position of the slide determining the flow section through said valve.

Advantageously, a setpoint position for the cut-off valve is determined by the calculation unit as a function of the difference between the values representative of the real mass flow rate of the fuel and the desired mass flow rate, and information representative of the real position of said valve is supplied to the calculation unit in order to servo-control said real position to the determined setpoint position.

According to another feature, fuel feed cut-off is implemented by causing the position-controlled valve to occupy a position in which substantially all of the fuel received from the high-pressure pump is returned to the low-pressure fuel circuit. The stop cut-off functions in the event of a normal stop or in the event of flame-out in the combustion chamber can thus be easily incorporated in addition to the functions of regulating the mass flow rate, of providing pressurization, and of providing cut off in the event of overspeed.

In another aspect, the invention also provides a flow rate regulation device suitable for implementing the above-defined method.

This object is achieved with a device comprising:
a high-pressure pump suitable for receiving, at an inlet, fuel from a low-pressure fuel circuit and for delivering high-pressure fuel at an outlet;
a flow rate regulation unit connected to the outlet from the high-pressure pump and including a position-controlled bypass valve; and
a stop-and-pressurizing cut-off valve of variable restriction that is arranged to pass the high-pressure fuel flow for supplying to the combustion chamber;

in which device:
the cut-off valve is associated with sensors suitable for providing information representative of the pressure difference between its inlet and outlet, and information representative of the position of a moving slide thereof that determines the flow section therethrough; and
a calculation unit connected to said sensors is suitable for calculating a value representative of the real mass flow rate of fuel passing through the cut-off valve in particular on the basis of the information representative of the pressure difference between its inlet and outlet, and of the position of its movable slide, and for controlling the position of the position-controlled valve as a function of the difference between the real mass flow rate and a setpoint mass flow rate in order to tend to eliminate said difference.

The cut-off valve may also constitute the overspeed cut-off valve.

In an embodiment of the device, it includes a sensor suitable for providing the calculation unit with information representative of the temperature of the fuel passing through the cut-off valve.

The device may include a density meter suitable for supplying the calculation unit with information representative of the density of the fuel passing through the cut-off valve, possibly together with information representative of the temperature of the fuel passing therethrough.

In another embodiment of the device, the slide of the cut-off valve is provided with a rod co-operating with the position sensor and made of a material that presents a coefficient of thermal expansion that is suitable for substantially compensating the influence of temperature on the density of the fuel passing through the cut-off valve.

According to a feature of the device, a position sensor is associated with the position-controlled valve to provide the calculation unit with information representative of the real position of said valve, and the calculation unit is suitable for servo-controlling the real position of said valve to a setpoint position that is calculated as a function of the difference between the real and desired mass flow rate.

Advantageously, the position-controlled valve is provided with a spring defining a minimum pressurization threshold for the fuel that is lower than the pressure for opening the valve constituting the stop-and-pressurizing cut-off valve.

The position of the position-controlled valve may be controlled by an electrohydraulic servo-valve or by an electric motor. If controlled by an electric motor, there is no need to have fuel available as a hydraulic servo-control fluid for controlling the position of the servo-valve. The hydraulic fluid circuit that normally includes a filter and a heater can therefore be omitted insofar as the other movable (or variable-geometry) portions of the turbomachine can be actuated without requiring hydraulic fluid, e.g. electrically.

According to an advantageous embodiment of the device, it further includes a data-recording medium having information stored thereon representative of particular characteristic functions of components of the device and suitable for being read by the calculation unit.

The calculation unit may be incorporated in the electrical regulation unit of the turbomachine. Thus, manufacturing dispersion among the components of this or that device may be taken into account without modifying the calculation means.

In a variant, the calculation unit is a dedicated local calculation unit having information stored therein that is representative of particular characteristic functions of components of the device, the calculation unit being capable of performing calculations locally for measuring and regulating the fuel mass flow rate.

BRIEF DESCRIPTION OF THE DRAWINGS

Other features and advantages of a method and a device of the invention appear on reading the following description given by way of non-limiting indication. Reference is made to the accompanying drawings, in which.

DETAILED DESCRIPTION OF EMBODIMENTS OF THE INVENTION

Figure 1:
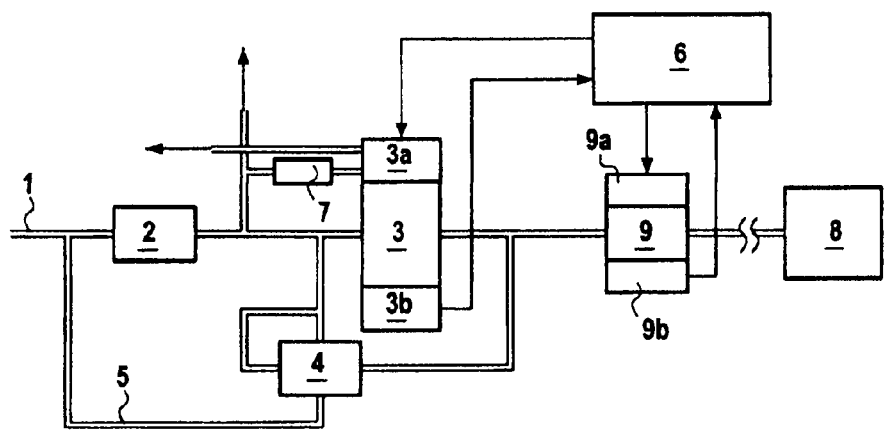
FIG. 1, described above, is a highly diagrammatic view of a known fuel feed and cut-off device for a turbomachine.

An embodiment of a device of the invention is described below with reference to FIG. 2 for an application to an airplane turbomachine.

Low-pressure (LP) fuel is supplied by a low-pressure fuel circuit 10 to the inlet of a high-pressure pump 12. The circuit 10 is fed with fuel coming from a tank of the airplane by means of a low-pressure pump (not shown). In the example shown, the high-pressure pump 12 is a rotary-gear positive-displacement pump that is driven by an accessory gearbox unit mechanically coupled to a turbine shaft of the turbomachine, in well-known manner. The pump 12 thus delivers high-pressure (HP) fuel at its outlet at a rate that is a function of the speed of the turbomachine.

On the HP fuel circuit 14 between the outlet of the pump 12 and the combustion chamber 16 with its injectors, there are mounted a valve 20 of controlled variable position and a variable-restriction valve 40.

The valve 20 in this example is a bypass valve having a slide or plug 22 of position that determines the fraction of the fuel flow received from the pump that is forwarded to the valve 40, the remaining, excess fraction being returned to the low-pressure fuel circuit 10 via a pipe 24.

The position of the slide 22 is controlled by an electrohydraulic servo-valve 30 having control outlets connected to chambers of the valve 20, on either side of the slide, and having a high-pressure port receiving the HP fuel and a low-pressure port connected to the LP fuel circuit 10. The fuel is used as a hydraulic servo-control fluid and the HP fuel is taken to the servo-valve 30 via a filter 32 and a heater 34 that operates by exchanging heat with the lubricating oil of the turbomachine. The servo-valve 30 is electrically controlled by the calculation unit 60 that provides an excitation signal to a control winding 36 of the servo-valve. A spring 25 is incorporated in the valve 20 to define a minimum pressurization threshold for the fuel on starting that makes it possible in particular for the servo-valve 30 to control the valve 20.

Advantageously, a position sensor 26 provides the calculation unit 60 with information Y representative of the position of the valve 20. By way of example, the sensor 26 may be an inductive sensor of the linear variable differential transformer (LVDT) type that operates in combination with a rod 28 secured to the slide 22 in well-known manner.

The variable-restriction valve 40 presents a flow section for the fuel that is a function of the position X of a piston-forming slide 42. The slide 42 is biased by a spring 44 towards the closed position of the valve 40, with the degree of opening thus being a function of the pressure of the fuel at the inlet to the valve 40. The flow section of the valve 40 is preferably defined so as to minimize the range of pressure differences between the inlet and the outlet.

A position sensor 46, e.g. of the LVDT type, operates in combination with a rod 48 secured to the slide 42 to provide the calculation unit 60 with information representative of the position X of the slide 42.

Another sensor 50 is connected to the inlet and to the outlet of the valve 40 in order to provide the calculation unit 60 with information representative of the pressure difference ΔP between the inlet and the outlet of the valve 40.

Furthermore, a density meter 52 is mounted on the HP fuel circuit to provide the calculation unit 60 with information representative of the density ρ of the fuel passing through the valve 40. The density meter 52 is located close to the valve 40, e.g. immediately at its outlet. Advantageously, the density meter includes a temperature probe to provide the calculation unit 60 with information representative of the temperature T of the fuel passing through the valve 40. It would also be possible to use a temperature sensor that is distinct from the density meter.

By way of example, the density meter 52 is provided with a probe that provides a signal that is representative of the permittivity E of the fuel by measuring capacitance between a plurality of concentric tubes placed in the core of the fuel flow. The signal representative of the permittivity E constitutes the information representative of the density ρ. When the temperature T and the permittivity E are known, the type of fuel can be recognized by the calculation unit 60 from tables that have been stored in advance giving the values of permittivity as a function of temperature for different types of fuel. Once the type of fuel has been identified, its density ρ can then be calculated from curves that have been stored in advance giving the density ρ as a function of temperature for different types of fuel. Other known types of density meter could be used.

Advantageously, the valve 40 constitutes the stop-and-pressurizing cut-off valve. The valve 40 has a chamber 40a that is situated on the same side of the slide 42 as its side that is subjected to the action of the spring 44, and that is opposite from its side that is subjected to the flow of fuel penetrating into the valve. The chamber 40a has a first port connected to the LP fuel circuit via a diaphragm 41 and a second port connected to the HP fuel circuit via a solenoid valve 54 that is controlled by the electronic regulation unit 62.

When the solenoid valve 54 is open, the high pressure applied to the chamber 40a acts together with the spring 44 to close the valve 40 against the pressure of the fuel at its inlet.

When the solenoid valve is closed (its normal position), the low pressure in the chamber 40a allows the valve 40 to open against the return force exerted by the spring 44. The spring 44 is rated to define a minimum fuel pressurization threshold from which fuel may be fed to the injectors of the combustion chamber. It should be observed that in the valve 20, the spring 25 is rated to a pressurization value that is sufficient to enable the fuel to be used as a hydraulic servo-control fluid, but below the threshold for opening the valve 40. As is well known, the pressurization of the fuel is useful for enabling it to be used as a hydraulic fluid for actuating the various moving or variable-geometry portions of the turbomachine.

The mass flow rate of fuel as delivered to the combustion chamber is regulated as follows.

The value $W_f$ of the real mass flow rate of fuel passing through the valve 40 is calculated by the calculation unit 60 in application of the following formula that is derived from Bernoulli's equation:

$$W_f = K\sqrt{\rho \cdot \Delta P}$$

where K is a coefficient that is a function of the flow section through the valve.

In practice, the value of K may be determined as a function of the position X of the slide 42 and as a function of the temperature T, both of which have an influence on the value of the flow section.

Figure 3:
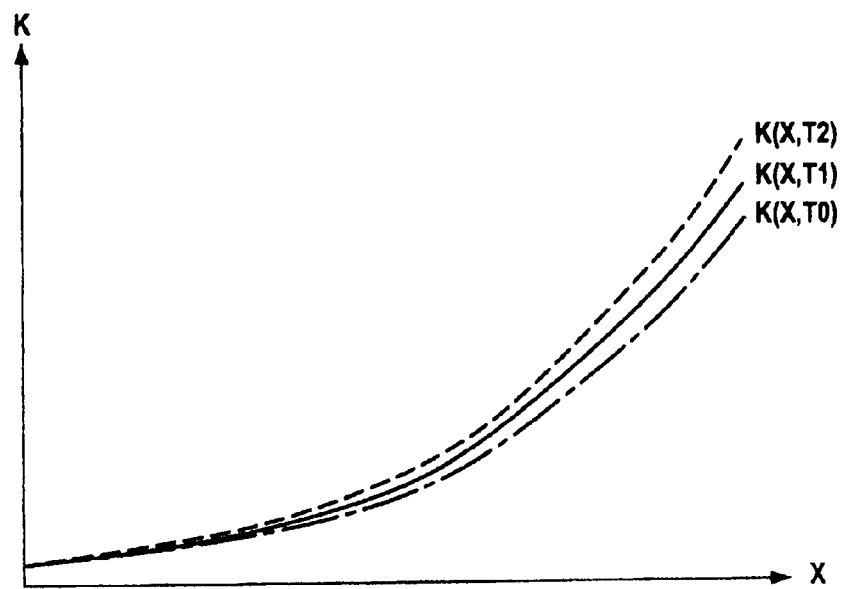
FIG. 3 plots curves representing examples of variation in a coefficient K used for calculating mass flow rate as a function of the position X of a valve member and of the temperature T of the fuel.

Curves or tables representing variations of K as a function of X and T may be pre-established by bench tests by using a mass flow meter and varying the position X in increments, with the values for ρ and T being known. Any influence of Reynolds number on K may be taken into account. This enables curves to be obtained of the kind shown in FIG. 3 that show the way K varies as a function of position X for various temperatures T0, T1, T2 for a given valve which, in this example, has a flow section that varies substantially exponentially as a function of the position X. Since these curves are stored in memory, the value of K can be deduced from X and T, thus enabling the real mass flow rate $W_f$ through the valve 40 to be calculated from the measured values of X, T, ρ, and ΔP.

The real value $W_f$ of the mass flow rate is servo-controlled to the desired value corresponding to the operating conditions of the turbomachine by taking action on the valve 20.

For this purpose, a setpoint position for the valve 20 may be calculated by the calculation unit 60 as a function of the difference between the calculated real mass flow rate and the desired mass flow rate. The relationship between the position Y of the slide 22 of the valve 20 and the fraction of the HP fuel flow that is received and actually forwarded to the valve 40 may be pre-established, e.g. by testing, and stored in advance. This relationship may also be observed and taken into account in real time since it is a function of operating conditions, such as the speed of the pump, the pressure in the combustion chamber, . . . . The servo-valve 30 is controlled by the electronic regulation unit 62 to bring the valve 20 into the setpoint position. The presence of the sensor 26 makes it possible to arrange a servo-control loop that acts more specifically to bring the measured real position Y to the setpoint value.

On the basis of knowledge about the relative value of the difference between the real mass flow rate as calculated and the desired mass flow rate, it is possible to use a shaping network to control the servo-valve 30 so as to modify the position of the valve 20 by successive increments until the difference is substantially eliminated.

It is possible to calculate the setpoint current for application to the servo-valve 30 as a function of the difference between the calculated real mass flow rate and the desired mass flow rate, with the relationship between the current applied to the servo-valve 30 and the fraction of the flow that is actually forwarded to the valve 40 being taken into account in real time since it is a function of operating conditions such as, for example: the speed (of rotation) of the pump 12, or the pressure in the combustion chamber.

In the above embodiment, a density meter is used to provide the calculation unit 60 with information representative of the density ρ and the temperature T of the fuel passing through the valve 40.

In a variant, it would be possible to use a temperature sensor on its own to provide the information T, so long as information is stored in advance and available to the calculation unit 60 for identifying the type of fuel in use by referring to information that provides the variation in the density of each type of fuel as a function of temperature.

For reasons of redundancy, the calculation unit 60 may be duplicated, as may the electronic regulation unit 62. The control windings of the servo-valve 30 and of the solenoid valve 54 and the sensors providing the positions X and Y should also then be duplicated.

Advantageously, the servo-valve 30 includes a control winding 38 that may be excited on command from the cockpit in order to stop the turbomachine in normal manner (normal stop shut-down) by placing the valve 20 in a position in which all or nearly all of the HP fuel received from the pump 12 is returned to the LP fuel circuit 10. The valve 40 then closes because of the drop in pressure at its input connected to the valve 20.

Fuel feed may also be cut off by the electronic regulation unit 62 in the event of the flame in the combustion chamber going out (flame-out shut-down) by acting on the servo-valve 30 to place the valve 20 in a position in which all or nearly all of the HP fuel received from the pump 12 is diverted to the LP fuel circuit, the valve 40 then closing.

In the event of overspeed being detected by measuring the speed of rotation of a turbine shaft of the turbomachine, the regulation unit 62 controls the solenoid valve 54 to close the valve 40, and the control current for the servo-valve 30 is switched off.

Thus, merely with the components 20, 30, 40, 50, the calculation unit 60, and the electronic regulation unit 62, the functions of regulating the mass flow rate, of shutting down to stop, of shutting down in the event of overspeed, and of pressurization for actuating the variable-geometry portions are all combined.

According to an advantageous feature, the pre-established individual characteristic functions of the components of the flow rate regulation device can be stored on a digital data medium, for example a radiofrequency identity (RFID) component 64 that is physically associated with the device.

These individual characteristic functions comprise at least the relationship giving the value of K as a function of X and possibly of T, and they may also include the transfer functions of the sensors, i.e. the relationships between the signals delivered by the sensors and the values of the detected magnitudes such as X, ΔP, ρ, T, and Y, and if necessary also the relationships between X and the flow section through the valve 40 and Y and the fraction of the flow received by the valve 20 that is forwarded (or the fraction that is returned).

When the digital data medium is an RFID component, the calculation unit 60 is arranged to communicate therewith, regardless of whether it is incorporated in the electronic regulation unit 62 of the turbomachine.

In a variant, it is possible to store this digital information in a memory of the calculation unit 60. The unit may then be a particular calculation unit that is not incorporated in the electronic regulation unit of the turbomachine and that is associated locally with the corresponding flow rate regulation device.

Under such circumstances, the local calculation unit may calculate the real mass flow rate $W_f$ from the data X, ΔP, and the data delivered by the density meter, and it may transmit the value of $W_f$ to the electronic regulation unit 62, possibly together with the data T and the data concerning the type of fuel, with the regulation unit 62 then generating the setpoint position for the slide of the valve 20. The assembly formed by the density meter, the variable-restriction valve, the pressure difference sensor ΔP, and the position sensors X may then constitute, together with the local calculation unit, a mass flow meter that is independent of the regulation unit of the turbomachine. The setpoint position for the slide of the valve 20 could also be calculated by the local calculation unit 60.

The digital information representing the characteristic functions of components of the flow rate regulation device may be stored in advance on reception of equipment including the components in question. By way of example, they may be obtained by testing performed on the components before they are put into service. This makes it possible in the calculations performed by the calculation unit 60 to ignore manufacturing dispersion concerning these components in different regulation devices, thereby increasing accuracy.

Figure 2:
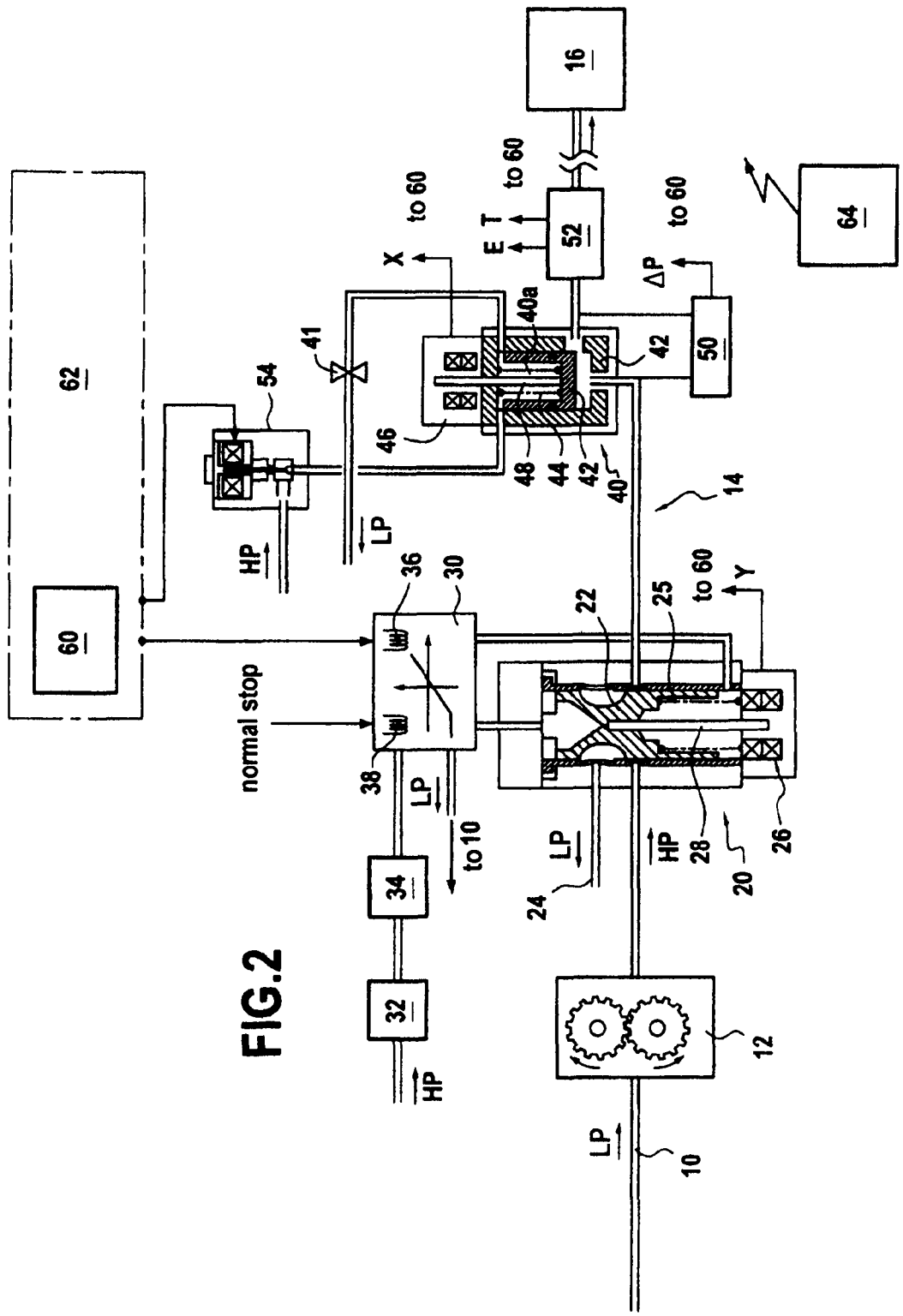
FIG. 2 is a diagram of an embodiment of a device of the invention.
Figure 4:
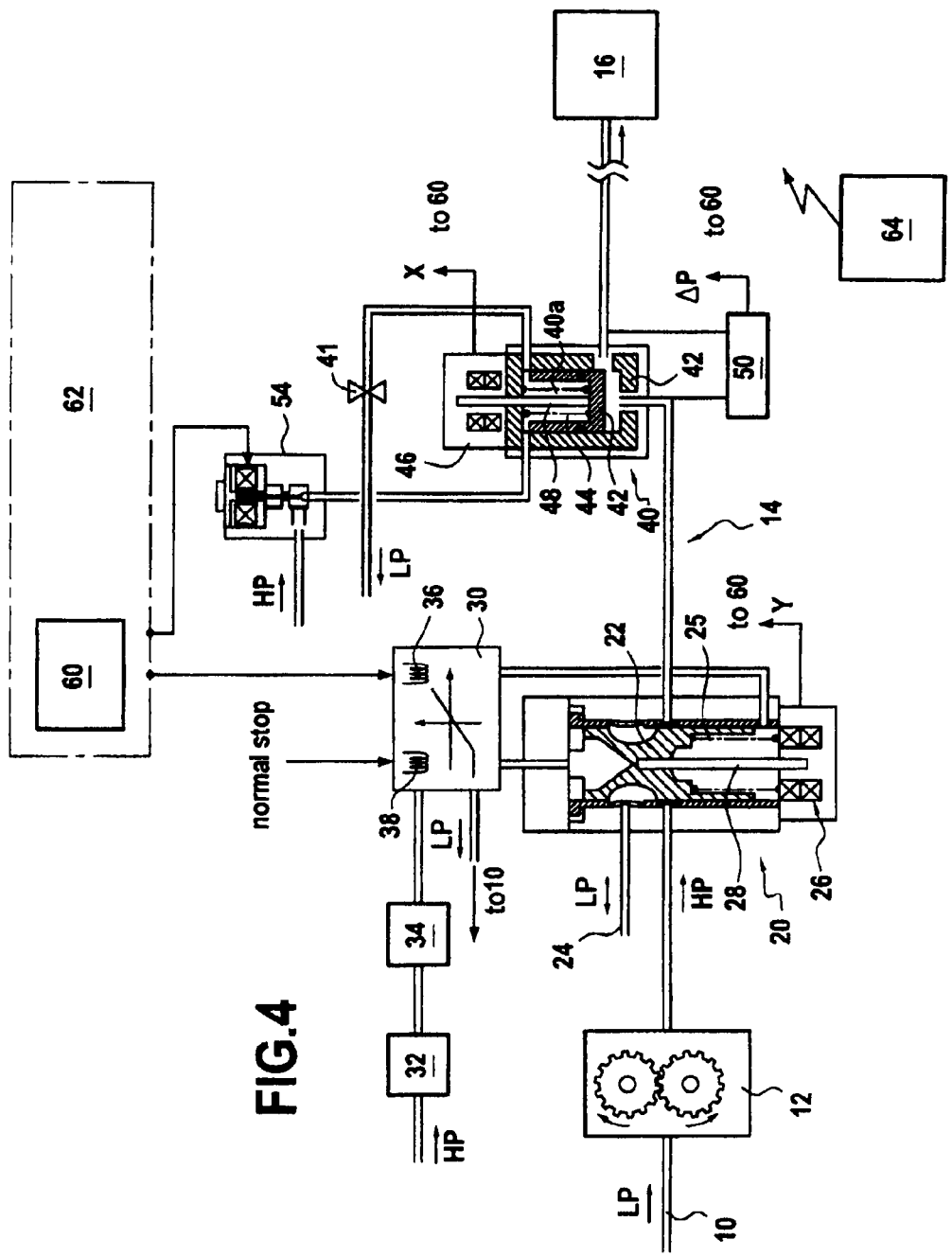
FIGS. 4, 5, and 6 are diagrammatic views of other embodiments of the invention.

FIG. 4 shows an embodiment that differs from the embodiment of FIG. 2 in that no density meter is provided.

It is possible that information concerning the type of fuel in use and information representing the density per fuel type at a given temperature, e.g. at the mean utilization temperature, to be stored in advance and available to the calculation unit 60.

The variation in the density of the fuel passing through the valve 40 as a function of temperature may be compensated by using a rod 48 made of a material that is selected to have a coefficient of thermal expansion that enables such compensation to be achieved, at least approximately. The density of the fuel decreases as its temperature increases, so a material is selected that causes the length of the rod to vary in such a manner that for a detected position X, the flow section increases a little as a function of temperature. As mentioned at the beginning of the description, such a compensation technique is itself known. The material of the rod 48 may be selected from aluminum, stainless steel, "Invar" (registered trademark), . . . .

For a given position X, a value is selected for the coefficient K, e.g. a value that is pre-established for the mean utilization temperature while using the most usual fuel.

Apart from the above-mentioned differences, the structure and the operation of the regulation device are similar to the embodiment of FIG. 2.

The embodiment of FIG. 4 is simplified compared with that of FIG. 2, and the real mass flow rate calculation is slightly less accurate because of the approximate nature of the compensation of density variation as a function of temperature, and because of the lack of compensation for the variation of the coefficient K as a function of temperature.

Figure 5:
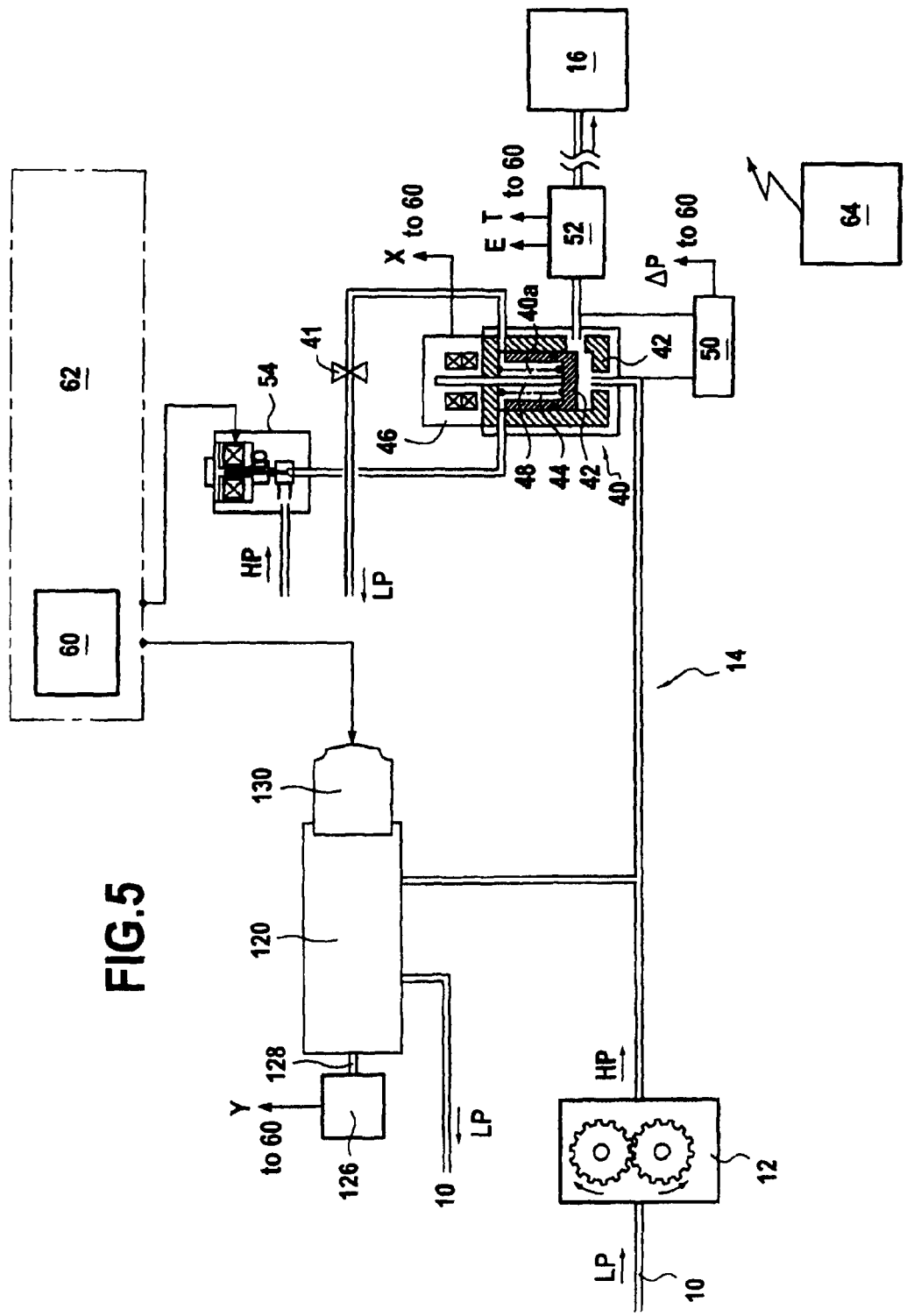

FIG. 5 is a diagram of an embodiment that differs from that of FIG. 2 in that the bypass valve 20 is actuated by an electric motor 130 controlled by the calculation unit 60.

The electric motor 130 may be a linear motor or a rotary motor. It acts on the position of the slide or plug of the valve in order to control the fraction of the HP fuel flow received from the pump 12 that is forwarded to the valve 40 and the fraction that is returned to the LP fuel circuit 10. The position Y of the valve is provided by a sensor 126 co-operating with a rod 128 that is secured to the slide (not shown) of the valve 120.

The use of an electric motor instead of an electrohydraulic servo-valve makes it pointless to deliver servo-control hydraulic fluid for the servo-valve. The flow sections of the ports of the chamber 40a of the valve 40 and of the servo-valve 44 are large enough for them to be insensitive to icing, such that the filter and the heater may be omitted if the other variable-geometry components of the turbomachine are not actuated using hydraulic fluid, as is the case when electric actuators are used.

Apart from the above differences, the structure and the operation of the regulation device are similar to the embodiment of FIG. 2. In the embodiment of FIG. 5, provision may also be made to measure the mass flow rate without making use of a density meter, as described with reference to FIG. 4.

In the description above, it is assumed that the HP fuel is delivered by a positive displacement type high-pressure pump.

Figure 6:
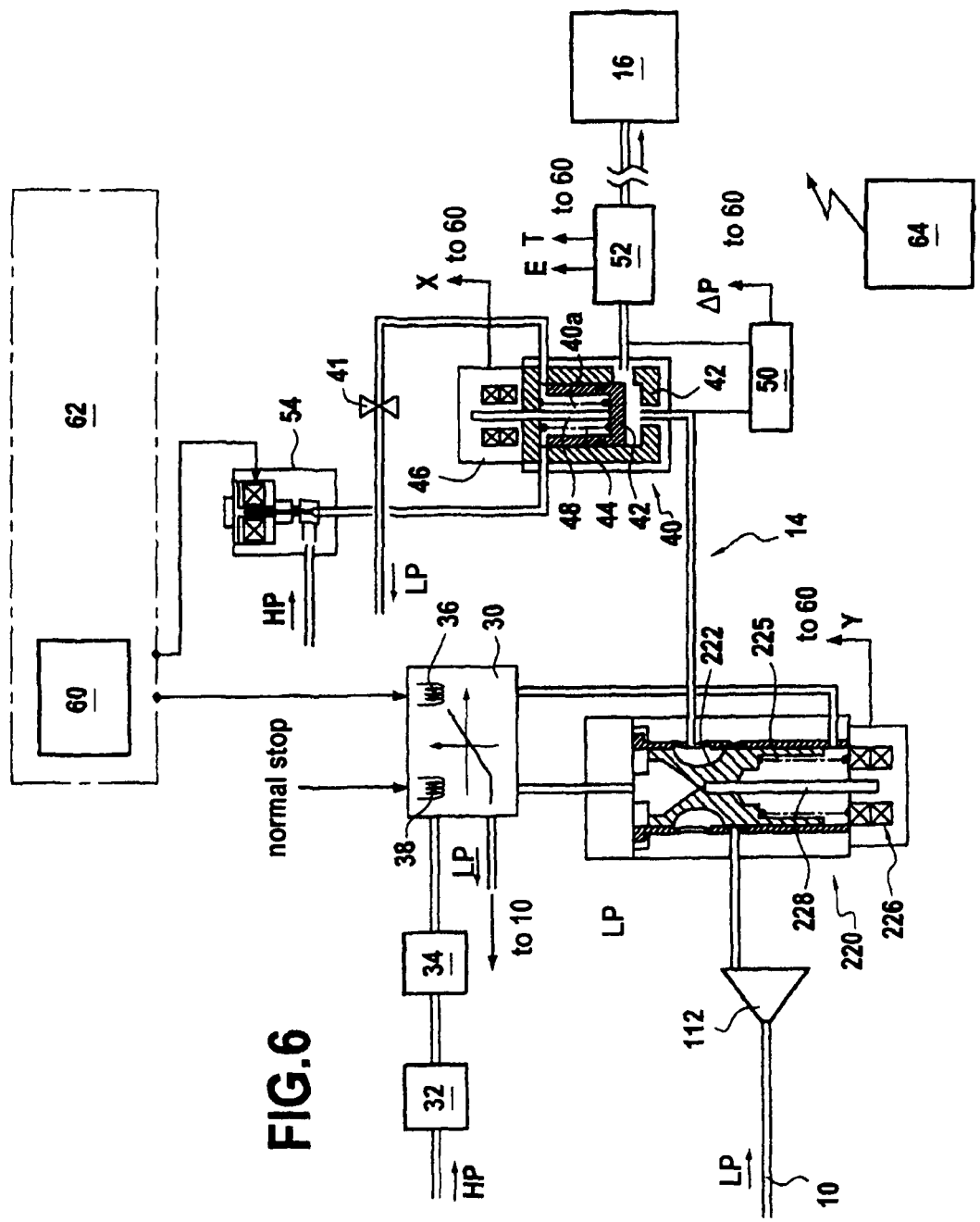

The invention is also usable when using a centrifugal type high-pressure pump, as shown in FIG. 6.

In FIG. 6, the centrifugal pump 112 supplies high-pressure fuel to the position-controlled valve 220 that is connected in series between the pump 112 and the valve 40. The valve 220 differs from the valve 20 of FIG. 2 or FIG. 4 and the valve 120 of FIG. 5 in that it does not have any excess fuel return to the LP fuel circuit 10. Depending on the position of its slide 222, the valve 220 throttles the delivery from the pump 112 to a greater or lesser extent, and the pump 112, by its structure, delivers pressure that is substantially constant regardless of flow rate. The slide 222 is subjected to the action of a closure spring 225 and is secured to a rod 228 co-operating with a position sensor 226 to provide the calculation unit with information representative of the position Y of the slide 222. The normal stop shut off is obtained by controlling the valve 220 to close. Otherwise, the fuel feed device may be similar to that of FIG. 2 or of FIG. 4 or of FIG. 5, the position of the position-controlled valve being controllable by an electrohydraulic servo-valve or an electric motor, and the real mass flow rate of fuel being measured with or without the help of a density meter.

The invention claimed is:

1. A method of feeding a turbomachine combustion chamber with fuel at a regulated flow rate, the method comprising: supplying high-pressure fuel by a high-pressure pump receiving the fuel from a low-pressure fuel circuit; using a flow rate regulation unit connected to an outlet from the high-pressure pump to supply high-pressure fuel at a controlled rate via a position-controlled valve and a variable-restriction stop-and-pressurizing cut-off valve, an outlet of the position-controlled valve being in fluid communication with an inlet of the variable-restriction stop-and-pressurizing cut-off valve; calculating a value representative of real mass flow rate of the fuel supplied to the combustion chamber by a calculation unit on the basis of information representative of the pressure difference between the inlet and an outlet of the variable-restriction stop-and-pressurizing cut-off valve and of a flow section therethrough; and controlling a position of the position-controlled valve by the calculation unit as a function of the difference between the calculated value representative of the real mass flow rate and a value that is representative of a desired mass flow rate.

2. A method according to claim 1, wherein the value representative of the real mass flow rate $W_f$ is calculated in application of the formula:

$$W_f = K\sqrt{\rho \cdot \Delta P}$$

wherein K is a coefficient of value that is a function of the flow section through the variable-restriction stop-and-pressurizing cut-off valve, $\rho$ is the density of the fuel passing through the variable-restriction stop-and-pressurizing cut-off valve, and $\Delta P$ is the pressure difference between the inlet and the outlet thereof.

3. A method according to claim 2, wherein the information representative of the flow section through the variable-restriction stop-and-pressurizing cut-off valve is provided by detecting the position X of a slide thereof.

4. A method according to claim 3, wherein information representative of the temperature T of the fuel passing through the variable-restriction stop-and-pressurizing cut-off valve is supplied to the calculation unit, and the value of K is determined as a function of the position X and of the temperature T.

5. A method according to claim 4, wherein the density ρ of the fuel is evaluated as a function of the temperature T and of a type of fuel used.

6. A method according to claim 2, wherein a density meter is used to provide the calculation unit with information representative of the density of the fuel passing through the variable-restriction stop-and-pressurizing cut-off valve.

7. A method according to claim 6, wherein the density meter also provides information representative of the temperature T of the fuel passing through the variable-restriction stop-and-pressurizing cut-off valve.

8. A method according to claim 3, wherein the position X of the slide of the variable-restriction stop-and-pressurizing cut-off valve is provided by a position sensor associated with a rod secured to the slide, and the rod is made of a material that is selected to have a coefficient of thermal expansion such that an influence of temperature on the density of the fuel passing through the variable-restriction stop-and-pressurizing cut-off valve is substantially compensated by the influence of temperature on the position of the slide determining the flow section through the variable-restriction stop-and-pressurizing cut-off valve.

9. A method according to claim 2, wherein a setpoint position for the variable-restriction stop-and-pressurizing cut-off valve is determined by the calculation unit as a function of the difference between the values representative of the real mass flow rate of the fuel and the desired mass flow rate, and information representative of the real position of the position-controlled valve is supplied to the calculation unit to servo-control the real position to the determined setpoint position.

10. A method according to claim 2, wherein fuel feed cut-off is implemented by causing the position-controlled valve to occupy a position in which substantially all of the fuel received from the high-pressure pump is returned to the low-pressure fuel circuit.

11. A method according to claim 2, wherein the position-controlled valve includes a spring that acts on starting to define a pressurization threshold enabling the fuel to be used as a servo-control hydraulic fluid, the pressurization threshold being lower than the pressure for opening the stop-and-pressurizing cut-off valve.

12. A device for feeding a turbomachine combustion chamber with fuel at a regulated flow rate, the device comprising: a high-pressure pump configured to receive, at an inlet, fuel from a low-pressure fuel circuit and for delivering high-pressure fuel at an outlet; a flow rate regulation unit connected to the outlet from the high-pressure pump and including a position-controlled bypass valve; and a variable-restriction stop-and-pressurizing cut-off valve that is arranged to pass the high-pressure fuel flow for supplying to the combustion chamber, an outlet of the position-controlled valve being in fluid communication with an inlet of the variable-restriction stop-and-pressurizing cut-off valve; wherein the variable-restriction stop-and-pressurizing cut-off valve is associated with a sensor connected to the inlet and the outlet of the variable-restriction stop-and-pressurizing cut-off valve, the sensor is configured to provide information representative of pressure difference between the inlet and an outlet thereof, and information representative of a position of a moving slide thereof that determines a flow section therethrough; and a calculation unit connected to the sensor is configured to calculate a value representative of a real mass flow rate of fuel passing through the variable-restriction stop-and-pressurizing cut-off valve based on the information representative of the pressure difference between the inlet and the outlet thereof, and of the position of the slide, and to control a position of the position-controlled valve as a function of the difference between the real mass flow rate and a setpoint mass flow rate.

13. A device according to claim 12, further comprising a sensor configured to provide the calculation unit with information representative of the temperature of the fuel passing through the variable-restriction stop-and-pressurizing cut-off valve.

14. A device according to claim 12, further comprising a density meter configured to provide the calculation unit with information representative of the density of the fuel passing through the variable-restriction stop-and-pressurizing cut-off valve.

15. A device according to claim 12, wherein the slide of the variable-restriction stop-and-pressurizing cut-off valve includes a rod co-operating with the position sensor and made of a material that presents a coefficient of thermal expansion that is configured to substantially compensate influence of temperature on the density of the fuel passing through the variable-restriction stop-and-pressurizing cut-off valve.

16. A device according to claim 12, wherein a position sensor is associated with the position-controlled valve to provide the calculation unit with information representative of the real position of the position-controlled valve, and the calculation unit is configured to servo-control the real position of the position-controlled valve to a setpoint position that is calculated as a function of the difference between the real and desired mass flow rate.

17. A device according to claim 12, wherein the position-controlled valve is controlled by an electric motor.

18. A device according to claim 12, wherein the position-controlled valve includes a spring defining a minimum pressurization threshold for the fuel that is lower than the opening pressure of the variable-restriction stop-and-pressurizing cut-off valve.

19. A device according to claim 12, further comprising a data recording medium having information stored thereon representative of particular characteristic functions of components of the device and configured to be read by the calculation unit.

20. A device according to claim 12, wherein the calculation unit is incorporated in an electronic regulation unit of the turbomachine or is a dedicated local calculation unit having information stored therein representative of particular characteristic functions of components of the device.

* * * * *